Jan. 17, 1933.    V. G. APPLE    1,894,724
STATOR WITH BUILT-IN CONDENSER
Filed Nov. 6, 1930    2 Sheets-Sheet 1

INVENTOR

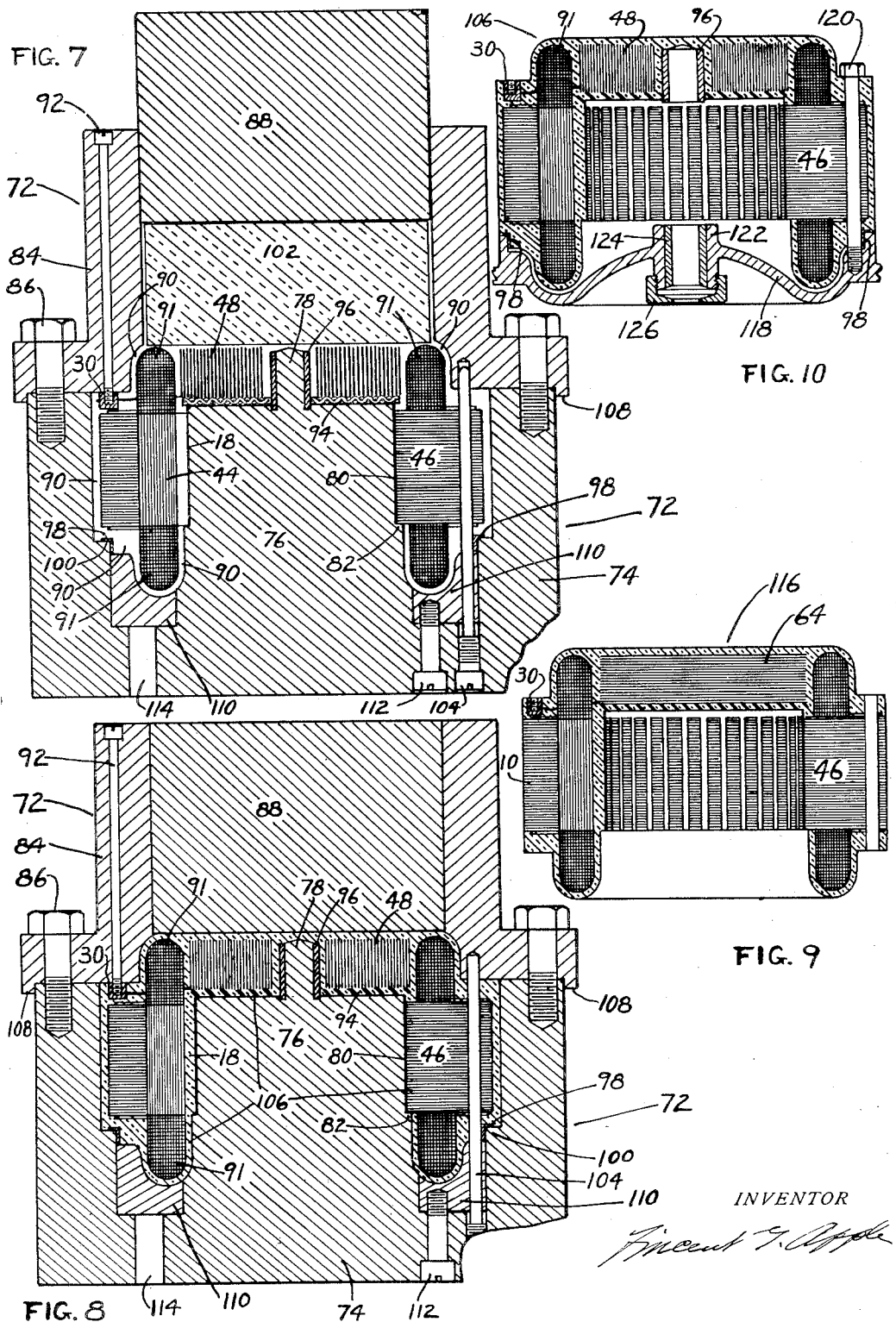

Patented Jan. 17, 1933

1,894,724

UNITED STATES PATENT OFFICE

VINCENT G. APPLE, OF DAYTON, OHIO, HERBERT F. APPLE, EDWARD M. APPLE AND GOURLEY DARROCH, EXECUTORS OF SAID VINCENT G. APPLE, DECEASED

STATOR WITH BUILT-IN CONDENSER

Application filed November 6, 1930. Serial No. 493,836.

This invention relates to stators for alternating current motors of the type having a condenser inserted in a portion of the winding to change the phase relation of that portion of the current which passes through the circuit containing the condenser, in order that a two phase motor may run from single phase current or a three phase motor from two phase current.

Motors of this type in relatively small sizes are extensively employed, and often in situations where the core, the windings and the condenser are subject to the deteriorating action of moisture, acid fumes etc., such as in mechanical refrigerating systems or for driving pumps etc., in which conventionally wound motors are extremely short lived.

An object of the invention is to provide a stator for a motor of this type, the body of which is composed entirely of a dense non-hygroscopic, acid-resisting insulating material, in which the core, the windings and the condenser, and the connections between the winding and the condenser as well, are imbedded, enclosed and hermetically sealed in suitably spaced apart relation, to the end that no moisture, acid fumes or other deteriorating substance may get to any of the parts of the motor which would be injuriously affected thereby, and to the end that separate mountings for the motor and the condenser need not be provided.

Another object is to so place the condenser relative to the core and windings as to make use of space which would not otherwise be employed, to the end that the combined stator and condenser structure will be no larger than a conventional stator of the same capacity not having a condenser.

I attain these objects by the structure hereinafter described and shown in the accompanying drawings, wherein—

Fig. 7 shows the wound core in a mold with the coil, the condenser and a bearing bushing supported in spaced relation, and a slug of unmolded compound in the mold ready to be pressed between and about these parts to keep them properly positioned and to form the body of the stator.

Fig. 8 shows the mold closed and the body of insulation formed about the core, windings, condenser and bearing.

Fig. 9 is an axial section through a stator which shows a modification of the invention.

Fig. 10 shows the stator assembled with a bearing head which closes the open end of the stator body.

Similar numerals refer to similar parts throughout the several views.

Figure 1:
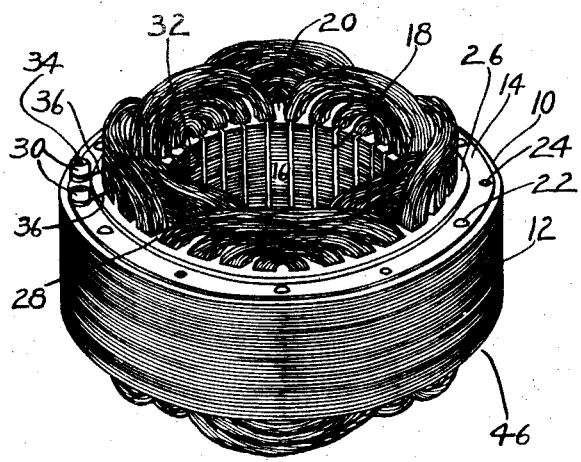
Fig. 1 is a perspective view of the core with the windings in place.

The core 10 is made up of a plurality of laminæ 12 with heavier metal end rings 14 at the ends of the core. The large central rotor opening 16 has a circular row of winding slots 18 surrounding it. The winding slots 18 are separated by teeth 20. The metal end rings 14 are thicker than the laminæ 12 but not quite so large in diameter. Rivets 22 hold the laminæ and end rings together. Openings 24 through the core may later be used for mounting bolts. The winding slots 18 are preferably lined with some suitable sheet insulation before the coils are placed in the slots. A heavy washer 26 of insulation has teeth 28 extending inwardly between adjacent slots.

In the winding I employ insulated magnet wire preferably of the kind having a cotton or other porous covering, and, by saturating and coating the covering with fluid insulation before winding it into the coils the individual turns of the coils are more securely separated by insulation. A convenient method of so coating wire and winding it into coils is shown and described in my copending application Serial No. 430,864, filed February 24th, 1930, but other coating methods may be employed if desired, or, the older method of first winding the wire into coils and afterward impregnating the coils with liquid insulation may be employed where the pressure incident to the subsequent molding operation is not too great.

Figure 6:
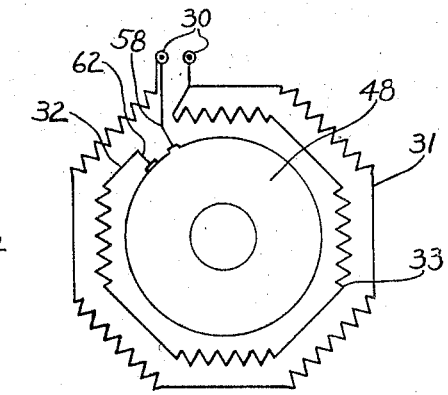
Fig. 6 is a diagram showing how the condenser is connected in the circuit.

Fig. 1 shows the core 10 with the coils in two circuits, one circuit for each phase, and terminal hubs 30 connected, one to the beginning of both circuits and the other to the end of one circuit only the end of the second circuit being brought out without a terminal hub as at 32. This end 32 is to be later soldered or otherwise electrically connected to one side of a condenser. A diagram of the winding as connected to a condenser is shown in Fig. 6 where 31 represents one phase, 33 the other phase and 48 the condenser, the whole being connected to the terminal hubs 30 as shown. Terminal hubs 30 are tapped at the upper end as at 34 for connection to the line, and are preferably roughened at the outside to anchor them in the insulation mass which will later surround them. At this stage of construction however terminal hubs 30 are unsupported except that they are soldered or otherwise electrically joined to the relatively heavy wires 36 which represent the ends of the coils.

Figure 2:
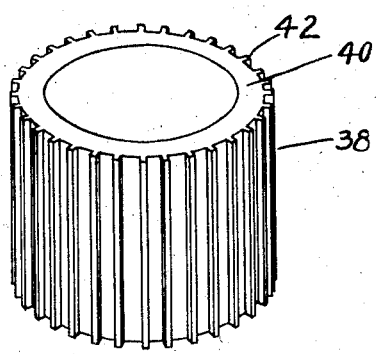
Fig. 2 is a perspective view of a tool employed to keep the coils out of the entrances of the winding slots until the coils are hardened.
Figure 3:
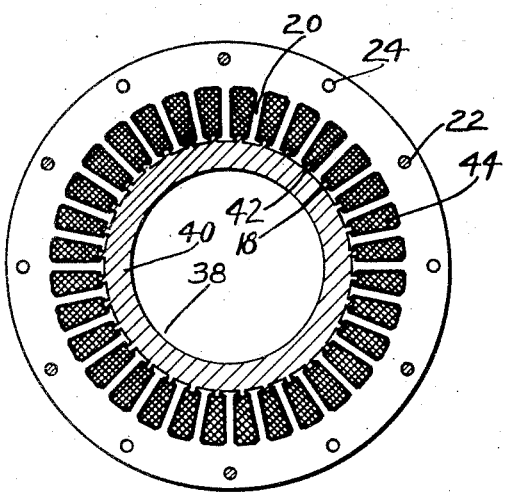
Fig. 3 is a transverse section through a wound structure with the tool Fig. 2 inserted, in which condition the coils are hardened.

Before the fluid insulation in the coils is hardened the tool 38 shown in Fig. 2 is preferably inserted in the rotor opening. Tool 38 comprises a hollow cylinder 40 with a series of keys 42 which in size, spacing and number correspond to the narrow entrances of the winding slots 18 through which the coil sides 44 are threaded. The transverse section Fig. 3 shows the tool 38 inserted and at this stage of construction the impregnating fluid in the coils is hardened. After the winding is rigid the tool 38 is withdrawn and the wound core which may be broadly designated by the numeral 46 is sufficiently pressure resisting to have the stator body of insulating material pressure molded around it.

Figure 4:
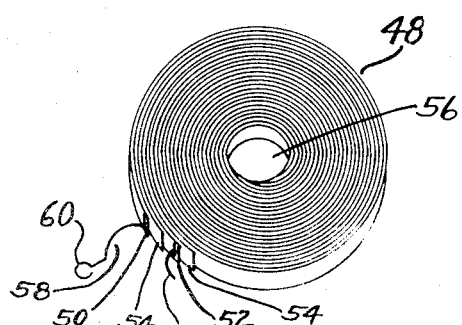
Fig. 4 shows a coil condenser which I incorporate in my structure.

Fig. 4 shows a preferred form of condenser 48 which I employ as part of my stator structure. This condenser comprises a strip 50 and a strip 52 of metal and two strips 54 of insulation, coiled as shown with the insulation strips electrically separating the metal strips. A central opening 56 is left in the coil the purpose of which will hereinafter appear.

Since the desirable arrangement of the circuits as shown in Fig. 2 is that one terminal of the condenser be connected to the line, a heavy terminal wire 58 is connected to the outer end of the strip 50. The outer end of terminal wire 58 is curled as at 60 so that it may readily be slipped over a terminal hub 30 and soldered or otherwise electrically connected. Another terminal wire 62 is brought out from the strip 52 and this wire may be twisted together with the end 32, Fig. 1, and soldered or welded.

Figure 5:
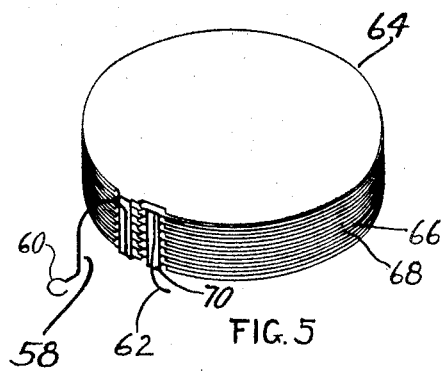
Fig. 5 shows a plate condenser which I may use in a modification of my invention.

Fig. 5 shows a plate condenser 64 which I may use in a modified form of my invention. This condenser comprises a plurality of metal plates 66 separated by plates of sheet insulation 68. Alternate plates are connected, half of them to a terminal wire 58 and the other half to a terminal wire 62. Condenser 64 may be connected to the winding in the same manner as condenser 48.

In both condensers 48 and 64 the thickness of the metal is greatly exaggerated for illustrative clearness.

To mold the body of insulation around the wound core and condenser the mold 72, Fig. 7, is provided, and in order that the insulation may completely surround the conductive portions of the structure and also cover the outer diameter and ends of the core the mold is arranged to support the core at its inner diameter. Mold 72 comprises a body 74 hollowed out to receive the wound core 46. Mold body 74 has a large upwardly extending center plug 76 with a smaller plug 78 extending upward centrally of the larger plug. Plug 76 is fitted to the rotor opening of the core snugly as at 80, the end of the core resting on the shoulder 82 to prevent downward movement of the core in the mold. The stock ring 84 is secured to the mold body by screws 86 and a plunger 88 is slidably fitted to the stock ring.

It will be seen that the wound core 46 touches the mold only at the inner diameter of the core as at 80 and at the shoulder 82, and that there is a continuous space 90 between the wound core 46 and the mold, extending around the coil heads 91 and around the ends and outside diameter of the core 10.

In practice the wound core 46, the condenser 48 and the stock ring 84 are temporarily laid together preferably with their axes horizontal and in alignment so that screws 92 may be entered into the terminal hubs 30 while the hubs are still readily accessible.

A pad 94 is laid over the upper end of the plug 76. This pad is preferably made of a thick layer of loosely woven cotton or similar fabric, heavily impregnated with insulation and highly compressed to the thin layer shown, but not cured. A bearing bushing 96 is placed over the plug 78. A flanged reinforcing ring 98 is laid in the mold body over the shoulder 100. The wound core, the condenser and the stock ring are then assembled with the mold body 74 and the body and stock ring are fastened together by screws 86. A quantity of uncured insulation 102 is now placed over the upper end of the condenser and coils, and the plunger 88 is then entered over the insulation.

Fig. 8 shows the mold closed whereby the insulation 102 has been pressed into the space shown at 90, Fig. 7, into the narrow entrances of the winding slots 18 which were left vacant when the keys 42 of the tool 38 were withdrawn, thus covering the coil sides 44, and between the bearing bushing 96 and the condenser 48, uniting with the pad 94 and forming a body of insulation which in one unbroken mass encloses and hermetically seals the core, the coils, the condenser, the terminals, the bearing bushing and the flanged reinforcing ring, except only such surfaces of some of these parts as are preferably exposed, as where the inner ends of the core teeth are exposed at the inner diameter of the stator, and where the openings and ends of the terminal hubs and the bearing bushings are necessarily left bare of insulation and where the outer diameter and the flange of the reinforcing ring are exposed to better resist wear or injury at this point. Special screws 104 exclude the insulation from the mounting holes 24 while molding is being effected.

When the body of insulation is cured the finished stator, which may hereinafter be designated by the numeral 106, may be removed from the mold. Removal is preferably accomplished by first removing screws 86 then resting the mold on the projecting edges 108 of the stock ring 84, and by pushing the plunger 88 downward, separating the stock ring from the mold body. An ejector ring 110 is held in the bottom of the mold body 74 by screws 112. By removing screws 112 and pushing through the holes 114 against the ring 110, the finished stator 106 may be ejected from the mold body.

Fig. 9 shows an axial section through a modified form of stator 116 embodying my invention. In this modification the plate condenser 64 shown in Fig. 5 has been employed and the bearing bushing 96 has been omitted, it being intended that this stator be employed in a motor having both of the rotor shaft bearings at the one end. Stator 116 differs further from the preferred form of stator 106 in that the body of insulation does not extend around the outside diameter of the core 10.

Fig. 10 shows the stator 106 fitted to the frame 118 of a machine which is to be motor operated. The metal reinforcing ring 98 locates the stator in the frame concentrically and axially. The stator is held to the frame by screws 120 extending through mounting holes 24. A bearing hub 122 is part of the frame 118 and carries a bearing bushing 124 in axial alignment with the molded-in bearing bushing 96. A packing nut 126 on the end of bearing hub 122 keeps foreign matter from the interior of the motor. The shaft and rotor are omitted, for clearness, since they form no part of the invention.

It will be seen that since the condenser 48 occupies the space between the coil heads 91 and the bearing bushing 96, which space would otherwise be vacant, it adds no length to the motor, and as a result an extremely compact structure is provided. It is also apparent that the manner in which the several parts are enclosed and hermetically sealed adapts the stator to situations where it is exposed to the action of moisture, acid fumes, etc.

Having described my invention, I claim—

1. An alternating current motor stator comprising, a magnetizable core having a rotor opening extending axially therethrough with a plurality of winding slots surrounding said rotor opening, core teeth extending inwardly between said slots to said rotor opening, a polyphase winding comprising coils with coil sides in said slots and coil heads at the ends of the core surrounding the said rotor opening, a coil condenser within one of said coil heads substantially closing one end of the rotor opening, said condenser being connected in series with one of said phases and having a central opening, a bearing bushing in said central opening, two terminal hubs, one connected to the beginning of both phases, the other being connected to the end of one phase directly and to the end of another phase through the condenser, and a stator body comprising a single mass of molded insulating material extending between and about the several parts of the structure to hold them in spaced relation, completely closing one end of the rotor opening, completely surrounding and hermetically sealing the coils and the condenser, and enclosing all parts of the core, the terminal hubs and the bearing bushing except the inner surfaces of the core teeth at the rotor opening and the inside and one end of the terminal hubs and the bearing bushing, which extend through the surface of the insulation.

2. An alternating current motor stator comprising a magnetizable core having a rotor opening extending axially therethrough, a polyphase winding on said core, said winding having portions extending axially beyond the core at the ends, a condenser at one end of said core within one of said extending portions substantially closing said rotor opening, said condenser being connected in series with one of said phases, terminal hubs for said condenser and said winding, and a stator body comprising a single mass of molded insulating material extending between and about the several parts to hold them in spaced relation, completely closing one end of the rotor opening, completely surrounding and hermetically sealing the winding and the condenser, and enclosing all parts of the core and the terminal hubs except the surface of the core in the rotor opening and the inside and one end of the terminal hubs.

3. An alternating current motor stator comprising a magnetizable core having an axial rotor opening, a plurality of circumferentially spaced apart winding apertures extending radially outward from said opening, a winding in said apertures extending axially beyond the ends of the core to form ring-like winding heads, a condenser at one end of the core situated in the space within one of said ring-like winding heads and connected in series with a portion of said winding, and a one piece mass of impervious insulation pressure molded to and about the structure but not otherwise fastened, said mass comprising a ring at one end of the core within which one winding head is imbedded, a shell surrounding and completely covering the outside of the core, struts extending through the core apertures within which the coil sides are imbedded, and a heavy end wall closing the end of the rotor opening, the other winding head being imbedded in said end wall and the condenser being imbedded in and supported midway within the thickness of said wall but not otherwise supported.

In testimony whereof I affix my signature.

VINCENT G. APPLE.